United States Patent [19]

Okamura et al.

[11] Patent Number: 5,585,177
[45] Date of Patent: Dec. 17, 1996

[54] METAL SHEET LAMINATED WITH TRIPLE LAYERED THERMOPLASTIC RESIN AND A METHOD FOR PRODUCTION THEREOF

[75] Inventors: Takaaki Okamura, Yanai; Kenzo Matsui, Yamaguchi-ken; Tsuneo Inui, Tokuyama, all of Japan

[73] Assignee: Toyo Kohan Co., Ltd., Tokyo, Japan

[21] Appl. No.: 138,743

[22] Filed: Oct. 19, 1993

[51] Int. Cl.⁶ ............................. B32B 15/08; B32B 27/36
[52] U.S. Cl. .................. 428/341; 220/455; 220/456; 220/457; 220/458; 428/35.8; 428/35.9; 428/412; 428/457; 428/458; 428/461; 428/463; 428/469; 428/480; 428/910
[58] Field of Search ................... 428/35.7, 35.8, 428/35.9, 412, 457, 458, 480, 910, 461, 463, 341, 469; 220/455, 456, 457, 458

[56] References Cited

U.S. PATENT DOCUMENTS

| | | | |
|---|---|---|---|
| 4,567,105 | 1/1986 | Giles, Jr. | 428/412 |
| 4,753,832 | 6/1988 | Brown et al. | 428/35 |
| 4,837,115 | 6/1989 | Igarashi et al. | 428/36.92 |
| 4,957,820 | 9/1990 | Heyes et al. | 428/623 |
| 5,008,137 | 4/1991 | Nugent, Jr. et al. | 428/35.4 |
| 5,059,460 | 10/1991 | Heyes et al. | 428/35.3 |

FOREIGN PATENT DOCUMENTS

| | | |
|---|---|---|
| 5-32491 | 1/1993 | Japan . |
| 6226915 | 8/1994 | Japan . |
| 2123746 | 2/1984 | United Kingdom . |

*Primary Examiner*—D. S. Nakarani
*Attorney, Agent, or Firm*—Felfe & Lynch

[57] ABSTRACT

A triple layered thermoplastic resin laminated metal sheet for a can stock having excellent flavor retention of packed foods and drinks, excellent formability, excellent adhesion of the thus laminated resin layer to a metal sheet and excellent denting resistance, particularly excellent denting resistance at a low temperature, which comprises formation of a triple layered thermoplastic resin layer wherein a polycarbonate resin layer is sandwiched between polyester resin outer and inner layers on one or both sides of a metal sheet covered with a single layer of hydrated chromium oxide or a double layer consisting of an upper layer of hydrated chromium oxide and a lower layer of metallic chromium by using conventional film laminating, extrusion coating or the combination of these techniques.

8 Claims, No Drawings

METAL SHEET LAMINATED WITH TRIPLE LAYERED THERMOPLASTIC RESIN AND A METHOD FOR PRODUCTION THEREOF

FIELD OF THE INVENTION

The present invention relates to a metal sheet laminated with a triple layered thermoplastic resin wherein a polycarbonate layer is sandwiched between polyester resin inner and outer layers by using conventional film laminating techniques, extrusion coating techniques and a combination of such techniques.

BACKGROUND OF THE INVENTION

Recently, direct lamination of a thermoplastic resin film to a metal sheet such as electrotinplate, tin free steel (TFS) and aluminum sheet has been attempted instead of lacquer coating, with the intention to prevent environmental pollution caused by discharge of solvent during curing the coated lacquer and decreased energy costs. For example, U.S. Pat. No. 4,517,255 and Japanese Patent Application No. Hei 2-418199 describe such a process.

In particular, U.S. Pat. No. 4,517,255 relates to a process for lamination of a crystalline polyester resin film to a metal sheet heated to a temperature of the melting point of the employed polyester resin and thereafter immediately quenching the laminate. The laminate according to this patent has been used for can stock such as drawn cans, can ends and five gallon cans because the laminated crystalline polyester resin film is sufficiently adhered to the metal sheet by an amorphous non-oriented polyester resin layer which is formed at the interface of the crystalline polyester resin film and the metal sheet as a result of the heating step. This laminate can be formed to a drawn and ironed can and a drawn and stretch formed can wherein more severe formability is required, if almost all of the laminated polyester resin film changes to an amorphous non-oriented state. However, the corrosion resistance in the formed part of the laminate becomes poor by this change of the laminated polyester resin film.

In order to improve the formability of this laminate described above, Japanese Patent Application No. Hei 2-418199 was proposed. In this reference there is described a copolyester resin film laminated metal sheet for a drawn and stretch formed can which comprises a 0.01 to 0.15 planar orientation coefficient in the outermost layer of the laminated polyester resin film and a 0 to 0.10 planar orientation coefficient in the polyester resin layer contacting with the surface of a metal sheet after lamination of copolyester resin film to the metal sheet. Presently, the laminate produced under the restricted conditions of this patent application are used for a drawn and stretch formed can which is treated with hot steam having a temperature of 120° to 130° C. in a retort after packing drinks such as green tea, black tea or coffee drink. This laminate can also be used for a drawn and stretch formed can packed with more corrosive foods and drinks, if the cans are produced and packed under normal conditions, i.e., conditions under which dents do not arise during production, packing or transport. However, some dents may arise in parts of the can body and can bottom by impact with other cans in the can making process or the transporting process after packing foods and drinks. The parts of the inside of the can body and the can bottom by impacts from the outside of the can body can become locally corroded, due to cracks arising in the laminated copolyester resin film.

Therefore, this laminate cannot be used for drawn and stretch formed cans in which severely corrosive foods and drinks are packed, if the cans may be subjected to denting during production, packing or transport.

In order to solve this problem described above, a polyester resin film laminated metal sheet according to Japanese Patent Application No. Hei 2-418198 has been developed. The laminate according to this patent is able to solve the problem described above. However, this laminate cannot be used for a drawn and stretch formed can in which carbonate beverages having severe corrosivity are packed at temperatures below about 5° C., as many cracks arise in the laminated polyester resin film on the inside of the can body by the impact of cans against each other in the transporting process after packing the beverage at low temperature. Laminates produced according to this patent do not have good resistance to denting at low temperatures.

Furthermore, in the production of these laminates, it is necessary that the set temperature in laminating the polyester resin film is controlled within a narrow range, because it is otherwise impossible to obtain a laminate having satisfactory characteristics required for drawn and stretch formed cans.

Recently, it has been proposed that all of these problems can be solved by the formation of a double thermoplastic resin layer consisting of an outer layer of polycarbonate resin and an inner layer of polyester resin on a metal sheet (Japanese Patent Application No. Hei 5-32491). Certainly, the laminate according to this Japanese Patent Application has excellent characteristics which can be applied for a drawn and stretch formed can and other can stock. However, it was recently found that the flavour of foods and drinks packed in the can produced by this laminate changed slightly during storage by adsorption of some composition of foods and drinks to the laminated polycarbonate resin outer layer contacting directly with foods and drinks.

SUMMARY OF THE INVENTION

Accordingly, it is a primary object of the present invention to provide a thermoplastic resin laminated metal sheet having excellent flavour retention of packed foods and drinks, excellent formability, excellent adhesion of the laminated resin layer to a metal sheet, excellent denting resistance, particularly excellent denting resistance at low temperatures which is required for can stock, especially for drawn and stretch formed cans and drawn and ironed cans, in which severely corrosive drinks are packed at low temperatures after severe forming.

It is another primary object of this invention is to provide a method for the continuous production of such a thermoplastic resin laminated metal sheet under such conditions which avoid severe control of the laminating temperature.

The aforesaid primary object of the present invention can be accomplished by the formation of triple layers of thermoplastic resin comprising a polycarbonate resin layer sandwiched between an outer layer and an inner layer of polyester resin on a metal sheet.

The second primary object of this invention can be accomplished by the following two methods. One method is the formation of the triple layers of thermoplastic resins described above on a metal sheet which has been heated to $Tm_1$ to $Tm_1+150°$ C. in the application of film laminating, where $Tm_1$ is the melting temperature of the polyester for the inner layer in the laminate according to the present invention. The other method is the formation of the triple layers of thermoplastic resin described above on a metal sheet which has been heated to $Tg+30°$ C. to $Tm_1+150°$ C. in the application of extrusion coating technique, where Tg is the glass transition temperature of the polyester resin for the inner layer in the laminate according to the present invention.

Therefore, in accordance with this invention there is provided a laminate comprising one or both sides of a metal sheet or metal strip which is laminated with a triple layer of thermoplastic resin comprising polyester outer and inner layers having recurring units according to the formula (1) and a polycarbonate resin middle layer sandwiched between said polyester outer and inner layers having recurring units according to the formula (2):

whereby formula (1) is of the structure,

Formula (1)

and wherein in formula ( 1 ), $R_1$ stands for an alkylene group having 2 to 6 carbon atoms and $R_2$ stands for an alkylene or arylene group having 2 to 24 carbon atoms, and whereby formula (2) is of the structure,

Formula (2)

and wherein in formula (2), $R_3$ stands for an aliphatic hydrocarbon having 2 to 10 carbon atoms or an aromatic hydrocarbon having 6 to 18 carbon atoms.

Furthermore, in accordance with this invention there is provided a method for producing the aforesaid laminate which comprises a method for producing the laminate according to claim 1, said method comprising heating a metal sheet to a temperature of about $Tm_1$ to about $Tm_1+150°$ C., where $Tm_1$ is the melting temperature of the polyester resin for the inner layer in the laminate according to claim 1, laminating a triple layered thermoplastic resin film consisting of polyester resin outer and inner layers shown in the formula (1) in claim 1 and a polycarbonate resin middle layer which is sandwiched between the polyester resin outer and inner layers shown in the formula (2) in claim 1 on the heated metal sheet, and thereafter quenching the laminate.

This triple layered thermoplastic resin laminated metal sheet can be used for applications in which severe formability, excellent corrosion resistance after forming and excellent flavour retention of packed foods and drinks are required, such as deeply drawn cans formed by multiple drawing, drawn and stretch formed cans, drawn and ironed cans, and can ends wherein a tab for easy opening is attached. This laminate is particularly suitable for a carbonate beverage can in which excellent denting resistance at a low temperature and excellent corrosion resistance are required, even if such cans are produced or transported continuously in a can making process and beverage packing process under abnormal conditions. Furthermore, this laminate can be also used for adhesived can bodies with or without adhesive, or weldable can bodies by stripe laminating except weldable parts.

The present invention is further explained by the following discussion of preferred embodiments inclusive of examples, which is to be understood as only intended as illustrative in nature and to in no way limit the scope and/or spirit of the claims and/or specification.

DETAILED DESCRIPTION OF THE PREFERRED EMBODIMENT

A polyester resin which forms an inner layer and an outer layer in the laminate according to the present invention consists of recurring units represented by the following general formula (1) .

Formula (1)

wherein $R_1$ stands for an alkylene group having 2 to 6 carbon atoms and $R_2$ stands for an alkylene group or arylene group having 2 to 24 carbon atoms.

It has been surprisingly and unexpectedly found that in the laminate according to the present invention, the presence of the polyester resin outer layer is indispensable due to its noticeable prevention of the adsorption of some compositions present in materials such as foods and drinks which are packed into a can formed by the laminate to the polycarbonate resin layer. As the result, the laminate according to the present invention maintains an excellent flavour retention of the packed foods and drinks.

Preferable examples of the polyester resin described in (1) for the outer layer in the laminate according to the present invention include polyethylene, terephthalate, polyethylene terephthalate/isophthalate copolyester from the standpoint of the desired quality of adhesion to the polycarbonate resin layer and the flavour retention qualities of packed foods and drinks. Furthermore, it is preferable to use a biaxially oriented polyester resin film and to keep the biaxial oriented structure in the polyester resin outer layer after lamination to the metal sheet from the standpoint of barrier of the laminated layer to the packed foods and drinks and providing a denting resistance. As the result, the laminate according to the present invention can be easily applied for can stock wherein severe corrosion resistance and excellent denting resistance are required.

The degree of the biaxial orientation in the employed polyester resin film and the laminated polyester resin film is represented by the planar orientation coefficient which is calculated by the following equation (1) from refractive indexes measured via a polarized monochromatic light in Abbe's refractometer.

$$Ns=(A+B)/2-C \qquad \text{Equation (1)}$$

where, Ns represents the planar orientation coefficient of the biaxially oriented polyester resin film before or after lamination.

"A" represents the refractive index in the lengthwise direction of the biaxially oriented polyester resin film before or after lamination.

"B" represents the refractive index in the widthwise direction of the biaxially oriented polyester resin film before or after lamination.

"C" represents the refractive index in the thickness direction of the biaxially oriented polyester resin film before or after lamination.

In order to obtain the effect of the biaxial orientation of the polyester outer layer described above, it is preferable to control the planar orientation coefficient of the polyester resin outer layer in the range of about 0.03 to about 0.12. If the planar orientation coefficient is less than about 0.03, the effect of the biaxial orientation described above is remarkably decreased. On the other hand, if the planar orientation coefficient is much more than about 0.12, the formability of the laminate becomes noticeably poor. As the result, the laminate can not be used for applications such as drawn and stretch formed cans and drawn ironed cans in which severe formability is required.

The degree of the biaxial orientation in the polyester resin film used for the outer layer in the laminate according to the present invention usually decreases by the lamination to the metal sheet, although it depends on the laminating conditions such as the temperature of the metal sheet to be laminated, the surface temperature of the laminating rolls and the time until quenching the laminate. Generally, if the temperature of the heated metal sheet and the surface temperature of the laminating rolls are higher, the planar orientation coefficient of the laminated polyester outer layer becomes a lower value. Although the planar orientation coefficient of the employed polyester resin film for the outer layer of the laminate according to the present invention should be determined by the laminating conditions described above, generally the biaxially oriented polyester resin film having about 0.10 to about 0.15 of the planar orientation coefficient is used.

The presence of the polyester resin inner layer in the laminate according to the present invention is indispensable in order to maintain the desired excellent adhesion of the laminated layer to the metal sheet even after severe forming. That is, the polyester inner layer acts as an adhesive between the polycarbonate middle layer and the metal sheet. As set forth above, the polyester resin for the inner layer in the laminate according to the present invention is selected from the polyester resin described in the formula (1) and it is preferable that a polyester resin be employed which is selected from the group consisting of polyethylene terephthalate, a copolyester resin having mainly recurring units of ethylene terephthalate, a copolyester resin having mainly recurring units of butylene terephthalate and a blend thereof.

It has also been unexpectedly and surprisingly found in accordance with this invention that the presence of a polycarbonate resin middle layer which is sandwiched between polyester resin outer and inner layers in the laminate is also indispensable in order to assure the desired denting resistance, particularly denting resistance at a low temperature, of the laminate. The employed polycarbonate resin consists of recurring units represented by the following formula (2):

Formula (2)

wherein $R_3$ stands for an aliphatic hydrocarbon having 2 to 10 carbon atoms or an aromatic hydrocarbon having 6 to 18 carbon atoms. The polycarbonate resin is preferably selected from an aromatic polycarbonate resin such as poly dihydroxy 2, 2 propane carbonate (Bisphenol A polycarbonate), poly dihydroxy diphenyl methane carbonate, poly dihydroxy diphenyl ethane carbonate, poly dihydroxy 2, 2 butane carbonate, poly dihydroxy diphenyl 2, 2 pentane carbonate, poly dihydroxy 3, 3 pentane carbonate, and poly dihydroxy diphenyl 2, 2 hexane carbonate.

An aliphatic polycarbonate resin can be used for applications in which severe formability is required but excellent heat resistance and excellent retortability are not required, because such a polycarbonate resin does not have the desired excellent heat resistance. From the standpoint of heat resistance, formability and economy, bisphenol A polycarbonate resin is most preferable for the present invention. Further, the mechanical properties of the employed polycarbonate resin are also an important factor from the standpoint of formability and denting resistance of the obtained laminate.

Specifically, it is preferable that an elongation at break of the polycarbonate resin is above about 70% measured under the conditions of ASTM D638. If a polycarbonate resin having even below about 70% of an elongation at break is used in the present invention, many cracks may arise in the laminated polycarbonate resin layer in addition to the polyester resin outer and inner layers of the laminate after severe forming or denting by impact. That is, the formability and denting resistance of the polycarbonate resin can become noticeably poor by a decrease in elongation at break.

As described above, the presence of each resin layer is indispensable in the laminate according to the present invention, in that one or more weak points in the characteristics of each resin layer is covered by corresponding desirable characteristics of the other resin layers. That is, the adsorption of some compositions of packed foods and drinks is prevented by the presence of the polyester resin outer layer, particularly the presence of biaxially oriented polyester resin outer layer, although this outer layer does not have the desired excellent denting resistance. The denting resistance, however, is remarkably improved by the presence of the polycarbonate resin middle layer, although this layer does not have the desired excellent adhesion to the metal sheet. The desired excellent adhesion to the metal sheet is maintained by the presence of the amorphous non-oriented polyester resin inner layer or fine crystallized polyester resin inner layer, although this layer does not have the desired excellent denting resistance.

The thickness of each layer should be selected from the standpoint of desired characteristics and economy. Although the thickness of each resin layer is not specifically limited, it is preferable in the laminate according to the present invention that the thickness of the polyester resin outer layer is about 1 to about 20 μm; the preferred thickness of the polycarbonate middle layer is about 1 to about 30 μm; and the preferred thickness of the polyester resin inner layer is about 0.5 to about 20 μm. Further, it is preferable that the total thickness of the laminated resin layer is less than about 70 μm from the standpoint of formability, and adhesion of the laminated resin layer to the metal sheet after forming and economy.

Metal sheet useful in the present invention can be steel sheet or strip, steel sheet or strip plated with at least tin, nickel and zinc, and aluminum sheet or strip. To provide the desired adhesion properties of the metal sheet to the laminated polyester resin inner layer, it is preferable that the metal sheet is covered with a single layer of hydrated chromium oxide or a double layer consisting of a lower layer of metallic chromium and an upper layer of hydrated chromium oxide. Particularly, the use of TFS is most preferable in the present invention.

The amount of plated tin, nickel and zinc on the steel sheet is preferably below about 3.0 g/m$^2$ respectively, for reasons of economy. However, if the amount of plated tin, nickel and zinc is below about 0.05 g/m$^2$, respectively, the effect of the plated tin, nickel and zinc on the corrosion resistance to the packed foods and drinks is hardly apparent, despite the addition of a further plating process.

As described above, it is an important factor in the present invention that the employed metal sheet is covered with a single layer of hydrated chromium oxide or a double layer consisting of a lower layer of metallic chromium and an upper layer of hydrated chromium oxide in order to obtain excellent adhesion of the laminated resin layer to the metal sheet, particularly after severe forming such as drawn and stretch formed cans and drawn and ironed cans.

The preferred amount of hydrated chromium oxide as chromium is about 3 to about 30 mg/m$^2$ in the single layer or the double layer. The preferred amount of metallic chromium in the double layer is about 10 to about 200 mg/m². If the amount of hydrated chromium oxide as chromium is below about 3 mg/m² or above about 30 mg/m², the adhesion of the laminated resin layer to the metal sheet may become poor after severe forming even if the amount of metallic chromium is about 10 to about 200 mg/m², particularly if the laminate is exposed to hot steam in a retort after packing foods and drinks. It is preferable that the deposition of metallic chromium improves the adhesion of the laminated resin layer to the metal sheet and the corrosion resistance of the obtained laminate. However, the deposition of metallic chromium above about 200 mg/m² is unnecessary in the present invention, because the corrosion resistance is not substantially improved, even if metallic chromium above about 200 mg/m² is deposited.

It is preferable to produce the laminate according to the present invention by the following methods, although the laminate can be produced by conventional film laminating techniques, extrusion coating techniques or the combination thereof.

(1) A triple layered resin film wherein a polycarbonate resin layer is sandwiched between polyester resin outer and inner layers is laminated on one or both sides of a metal sheet which has been heated to a temperature of $Tm_1$ to $Tm_1+150°$ C., where $Tm_1$ is the melting temperature of the polyester resin for the inner layer in the laminate according to the present invention, and then the laminate is rapidly or gradually quenched.

(2) A coextruded triple layered resin wherein a polycarbonate resin layer is sandwiched between polyester resin outer and inner layers is coated on one or both sides of a metal sheet which has been heated to $Tg+30°$ C. to $Tm_1+150°$ C., where Tg is the glass transition temperature of the polyester resin for the inner layer in the laminate according to the present invention, and then the laminate is rapidly or gradually quenched.

(3) A double layered resin film consisting of a polycarbonate resin layer and a polyester resin layer is laminated on one or both sides of a metal sheet which has been heated to a temperature of $Tm_1$ to $Tm_1+150°$ C., in the state that said polyester resin layer contacts with said metal sheet. After that, a polyester resin film is laminated on the surface of the obtained laminate having a surface temperature of $Tm_2$ to $Tm_2+150°$ C., where $Tm_2$ is the melting temperature of the polyester resin for the outer layer in the laminate according to the present invention, and then the laminate is rapidly or gradually quenched.

(4) A polyester resin film is laminated on one or both sides of a metal sheet which has been heated to a temperature of $Tm_1$ to $Tm_1+150°$ C. After that, a double layered resin film consisting of a polycarbonate resin layer and a polyester resin layer is laminated on the obtained laminate having a surface temperature of $Tm_1$ to $Tm_1+150°$ C., in the state that said polycarbonate resin layer with the surface of the obtained laminate, and then the laminate is rapidly or gradually quenched.

(5) An extruded polyester resin is coated on one or both sides of a metal sheet which has been heated to a temperature of $Tg+30°$ C. to $Tm_1+150°$ C. After that, a double layered resin film consisting of a polycarbonate resin layer and a polyester resin layer is laminated on the surface of the obtained laminate having a surface temperature of $Tm_1$ to $Tm_1+150°$ C., in the state that said polycarbonate resin layer contacts with the surface of the obtained laminate, and then the laminate is rapidly or gradually quenched.

In the production of the laminate according to the present invention by the film laminating technique, it is important to heat the metal sheet to a temperature above the melting temperature of the polyester resin film contacting with said metal sheet in order to obtain excellent adhesion of the laminated resin film to the metal sheet. However in the production of the laminate according to the present invention by extrusion coating technique, excellent adhesion of the laminated resin to the metal sheet is obtained by heating the metal sheet to a temperature above the glass transition temperature, because the polyester resin to be coated is sufficiently melted. Further, it is necessary that the surface temperature of the laminate having the polycarbonate resin outer layer should be kept to a temperature above $Tm_2$, in order to obtain excellent adhesion of the laminated polyester resin film to the surface of the polycarbonate resin layer.

In above descriptions (1) to (5), $Tm_1$ and $Tm_2$ represent the melting temperature of the employed polyester resin for the inner and outer layers, respectively, which exhibit an endothermic peak in an ordinary differential thermal analysis run at heating rate of 10° C./min. In blended polyester resin, two endothermic peaks are usually observed. In this case, the endothermic peak at higher temperature is generally used as the melting temperature of the employed polyester resin.

In these methods, amorphous non-oriented, monoaxially or biaxially oriented resin film is used for the outer layer and the inner layer in the laminate according to the present invention. However, in the use of monoaxially or biaxially oriented polyester resin film for the inner layer at least some parts of the laminated polyester inner layer contacting with the metal sheet should be changed to a non-oriented amorphous structure or fine crystallized structure from the monoaxially or biaxially oriented structure after lamination to the metal sheet in order to obtain the desired excellent adhesion of the laminated resin layer to the metal sheet.

In these methods, it is not preferable that the metal sheet is maintained in a temperature above $Tm_1+150°$ C. or $Tm_2+150°$ C. until quenching the laminate from the lamination, because the adhesion of the laminated resin layer to the metal sheet and the formability of the laminate becomes poor by the deterioration of the laminated resin film by heating. Further, the surface of the laminated polyester resin outer layer may be tacked with the laminating roll by melting of the laminated polyester resin outer layer. Therefore, the laminating conditions such as the temperature of the heated metal sheet, the surface temperature of the laminating roll, and the elapsed time until quenching the laminate after lamination should be determined by the characteristics of the employed polyester resin for the outer layer and the inner layer, as well as the method for forming, and the use of the laminate.

The method for heating the metal sheet is not critical to the present invention. However, from the standpoint of the continuous and stable production of the laminate at high speed, conduction heating by rolls heated by induction heating, induction heating and/or resistance heating are suitable as a method for heating the metal sheet, because the metal sheet can be rapidly heated and the temperature of the heated metal sheet can be easily controlled.

Furthermore, it is also preferable in the present invention that heating with rolls heated by hot steam or heating in an electric oven can be used as auxiliary methods for preheating the metal sheet to be laminated.

In the method for producing the laminate according to the present invention, whether the laminate is gradually quenched or rapidly quenched is selected by the composition and the state of the polyester resin for the inner layer of the laminate, the characteristics required in the obtained laminate, and the laminating conditions and the method for forming the obtained laminate.

The present invention can be applied for the production of the laminate wherein one side of the metal sheet is laminated with the triple layered resin film by the application of the methods described above and the other side of the metal sheet is laminated with other material such as polyolefin resin and polyamide resin.

In the method described above, the polyolefin resin is selected from the group consisting of polypropylene having a bonding resin, a low density polyethylene, a medium density polyethylene and a high density polyethylene. The polyamide resin is selected from the group consisting of nylon 6, nylon 66, nylon 11 and nylon 12 having a bonding resin.

The present invention is explained in further detail by the following examples.

EXAMPLE 1

A biaxially oriented triple layered resin film in which a bisphenol A polycarbonate layer having a thickness of 7 μm and an elongation at break of 125% was sandwiched between polyester resin outer and inner layers consisting of polyethylene terephthalate/isophthalate copolyester was produced by a condensation polymerization of 100 mole % of ethylene glycol and dicarboxylic acid consisting of 88 mole % of terephthalic acid and 12 mole % of isophthalic acid (thickness of polyester outer layer: 10 μm, thickness of polyester inner layer: 5 μm, planar orientation coefficient of polyester outer layer: 0.13). The aforesaid resin film was laminated by using a pair of laminating rolls having a surface temperature of 90° C. on both sides of TFS strip having a thickness of 0.26 mm, a width of 250 mm and a temper of T-5 (metallic chromium: 105 mg/m$^2$, hydrated chromium oxide: 17 mg/m$^2$ as chromium) which had been heated to 255° C. by using rolls heated by induction heating. After that, the laminate was immediately quenched in water.

EXAMPLE 2

A non-oriented polyester resin film consisting of 50 weight % of polyethylene terephthalate and 50 weight % of polybutylene terephthalate (thickness: 7 μm, melting temperature: 252° C.) was laminated by using a pair of laminating rolls having a surface temperature of 90° C. on both sides of electrolytically treated aluminum strip having a thickness of 0.26 mm and a width of 250 mm (metallic chromium: 20 mg/m$^2$, hydrated chromium oxide: 8 mg/m$^2$ as chromium) which had been heated to 270° C. by using rolls heated by induction heating. After 3 seconds, a non-oriented double layered resin film consisting of bisphenol A polycarbonate layer for the middle layer having a thickness of 7 μm and polyester resin layer for the outer layer having the same composition as in Example 1 and a thickness of 8 μm was laminated by using a pair of laminating rolls having a surface temperature of 90° C. on said polyester resin laminated aluminum strip having a surface temperature of 262° C. under the conditions where the polycarbonate resin layer contacted said polyester resin laminated aluminum strip. The obtained laminate was quenched in water after 2 seconds.

EXAMPLE 3

A non-oriented double layered resin film consisting of bisphenol A polycarbonate having a thickness of 5 μm and an elongation at break of 125% and a polyester resin layer consisting of 50 weight % of polyethylene terephthalate and 50 weight % of polybutylene terephthalate having a thickness of 10 μm and a melting temperature of 252° C. was laminated by using a pair of laminating rolls having a surface temperature of 120° C. on both sides of the same TFS strip as in Example 1 under the conditions wherein the polyester resin layer contacted the TFS strip which had been heated to 285° C. by using rolls heated by induction heating. After 2 seconds, a biaxially oriented polyethylene terephthalate film having a thickness of 12 μm, a melting temperature of 256° C. and a planar orientation coefficient of 0.14 was laminated by using a pair of laminating rolls having a surface temperature 100° on said double layered resin film laminated TFS strip having a surface temperature of 276° C. and then the obtained laminate was quenched in water after 1 second.

EXAMPLE 4

A blended polyester resin consisting of 50 weight % of polyethylene terephthalate and 50 weight % of polybutylene terephthalate (melting temperature: 252° C.) melted at a temperature of 280° C. was laminated at a thickness of 10 μm by an extrusion coating method on both sides of TFS strip having a thickness of 0.26 mm, a width of 250 mm and a temper of T-5 (metallic chromium: 85 mg/m$^2$, hydrated chromium oxide: 23 mg/m$^2$ as chromium) which had been heated to 270° C. by using rolls heated by induction heating. After 3 second, a biaxially oriented double layered resin film consisting of bisphenol A polycarbonate layer for the middle layer having an elongation at break of 125% and a thickness of 8 μm, and polyethylene terephthalate/isophthalate copolyester resin layer for the outer layer produced by a condensation polymerization of 100 mole % of ethylene glycol and dicarboxylic acid consisting of 94 mole % of terephthalic acid and 6 mole % of isophthalic acid (thickness : 8 μm, planar orientation coefficient : 0.11) was laminated by using a pair of laminating rolls having a surface temperature of 95° C. on said blended polyester resin laminated TFS strip having a surface temperature of 262° C. and then the obtained laminate was immediately quenched in water.

EXAMPLE 5

A cold rolled steel strip having a thickness of 0.26 mm, a width of 250 mm and a temper of T-5 was electrolytically degreased and then pickled under known conditions. The steel strip, after rinsing with water, was electroplated with 1.5 g/m$^2$ of tin by using a tinplating electrolyte consisting of 80 g/l of stannous sulfate, 60 g/l of phenolsulfonic acid (65% solution) and 0.06 g/l of ethoxylated α-naphthol in water under 20 A/dm$^2$ of cathodic current density at an electrolyte temperature of 45° C. After rinsing with water, TFS film (metallic chromium: 70 mg/m$^2$, hydrated chromium oxide: 13 mg/m$^2$ as chromium) was formed by cathodic treatment on both sides of the tin plated steel strip by using an electrolyte consisting of 50 g/l of chromic acid and 0.5 g/l of sulfuric acid in water under 40 A/dm$^2$ of cathodic current density at an electrolyte temperature of 50° C. The thus treated tin plated steel strip was rinsed with hot water and dried.

A coextruded resin having triple layer which was heated to 290° C. consisting of the same composition and the same thickness as in Example 1 was laminated on both sides of the tin plated steel strip which had been heated to 218° C. and then the laminate was immediately quenched in water.

Comparative Example 1

A non-oriented bisphenol A polycarbonate film having a thickness of 20 μm was laminated on both sides of the same TFS strip as in Example 1 which had been heated to 300° C, and then the laminate was immediately quenched in water.

Comparative Example 2

A biaxially oriented polyethylene terephthalate/isophthalate copolyester resin film produced by a condensation polymerization of 100 mole % of ethylene glycol and dicarboxylic acid consisting of 88 mole % of terephthalic acid and 12 mole % of isophthalic acid (thickness: 22 μm, melting temperature: 228° C., planar orientation coefficient: 0.14) was laminated by using a pair of laminating rolls having a surface temperature of 90° C. on both sides of the same TFS strip as in Example 1 which had been heated to 260° C. by using rolls heated by induction heating, and then the laminate was immediately quenched in water.

Comparative Example 3

A biaxially oriented double layered resin film consisting of a bisphenol A outer layer having the same as in the middle layer of Example 1 and copolyester resin inner layer having the same composition and the same thickness as in the inner layer of Example 1 was laminated on both sides of the same TFS strip as in the inner layer in Example 1 under the same conditions as in Example 1. After 2 seconds, the laminate was quenched in water.

The resulting laminate was formed to a drawn and stretch formed can under the following conditions:

Forming conditions

A. Drawing process
Diameter of circular blank: 187 mm
Drawing ratio: 1.50
B. Redrawing process
First redrawing ratio: 1.29
Second redrawing ratio: 1.24
Third redrawing ratio: 1.20
Curvature radius in a corner of dies used for redrawing process: 0.4 mm
Load for preventing wrinkle: 6000 kg
C. Average ratio of a thickness of metal sheet in can body to can end: −20%

The characteristics of the drawn and stretch formed can obtained under the conditions described above was evaluated by the following testing methods. The results are shown in the Table below.

(1) Adhesion of the laminated resin layer after forming

The adhesion of the laminated resin layer to the metal sheet was evaluated by the degree of the peeling off of the resin layer in a cup obtained in each redrawing process by naked eye.

(2) Flavour retention of drinks

Fanta Orange produced by The Coca Cola Co. was packed in the obtained drawn and stretch formed can. The flavour of the packed Fanta Orange after storage for 3 weeks at 37° C. was compared with that before packing by a panel of 100 persons.

The results of the panel were tabulated in accordance with the following key:

Above 90 persons judging no difference in flavor: Good

Above 60 and below 90 persons judging no difference in flavor: Fair

Below 60 persons judging no difference in flavor: Poor (3) Denting resistance of the laminate resin film at low temperature.

A sample having a width of 30 mm and a length of 30 mm was cut from the can end of the obtained drawn and stretch formed can. A steel rod having a steel globe whose diameter was ½ inches, and having a weight of 1 kg was dropped from a height of 40 mm to the sample which was picked up after immersion into ice water for 5 minutes. After that, the denting resistance in the convex part of the sample was evaluated by a current value between an anode of metal exposed through cracks of the laminated resin layer and a cathode of stainless steel rod contacted through a sponge including 3% sodium chloride solution at a constant voltage of 6.3 volts.

TABLE

| | Ex.1 | Ex.2 | Ex.3 | Ex.4 | Ex.5 | Comp. Ex.1 | Comp. Ex. 2 | Comp. Ex. 3 |
|---|---|---|---|---|---|---|---|---|
| Base metal sheet Composition of the laminated resin layer (Thickness; μm) | TFS | Al | TFS | TFS | Tin-plate | TFS | TFS | TFS |
| Outer layer | P—PI** (10) | P—PI (8) | PET$^{III}$ (12) | P—PI (8) | P—PI (10) | PC (20) | P—PI (22) | PC (7) |
| Middle layer | PC* (7) | PC (7) | PC (5) | PC (5) | PC (7) | None | None | None |
| Inner layer | P—PI (5) | P/PB$^{IV}$ (7) | P/PB (10) | P/PB (10) | P—PI (5) | None | None | P—PI (5) |
| Ns$^V$ of outer layer after lamination Characteristics of the laminate | 0.04 | 0 | 0.05 | 0.05 | 0 | 0 | 0.05 | 0 |
| Adhesion to metal sheet after forming | Good | Good | Good | Good | Good | Peel in 2nd redraw | Good | Good |
| Retaining flavour | Good | Fair | Good | Good | Fair | —$^{VI}$ | Good | Poor |
| Denting resistance | 0 | 0 | 0 | 0 | 0 | — | 0.47 | 0 |

TABLE-continued

|  | Ex.1 | Ex.2 | Ex.3 | Ex.4 | Ex.5 | Comp. Ex.1 | Comp. Ex. 2 | Comp. Ex. 3 |
|---|---|---|---|---|---|---|---|---|
| at low temp. (mA) | | | | | | | | |

Key:
*PC denotes bisphenol A polycarbonate.
**P—PI denotes copolyester resin consisting of polyethylene terephthalate/isophthalate.
IIIPET denotes polyethylene terephthalate.
IVP/PB denotes blended polyester resin consisting of 50 weight % of polyethylene terephthalate and 50 weight % of polybutylene terephthalate.
VNs denotes a planar orientation coefficient.
VI— denotes no evaluation for the peeling off the laminated resin film.

What is claimed is:

1. A laminate comprising one or both sides of a metal sheet which is laminated with a triple layer of thermoplastic resin comprising polyester outer and inner layers having recurring units according to the formula (1) and polycarbonate resin middle layer sandwiched between said polyester outer and inner layers having recurring units according to the formula (2):

wherein Formula (1) has the structure,

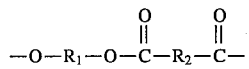 Formula (1)

and wherein in Formula (1), $R_1$ stands for an alkylene group having 2 to 6 carbon atoms and $R_2$ stands for an alkylene or arylene group having 2 to 24 carbon atoms, and wherein Formula (2) has the structure,

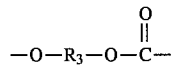 Formula (2)

and wherein in Formula (2), $R_3$ stands for an aliphatic hydrocarbon having 2 to 10 carbon atoms or an aromatic hydrocarbon having 6 to 18 carbon atoms, the outer polyester of the triple layer being a biaxially oriented polyester.

2. The laminate of claim 1 wherein said polyester outer layer is polyethylene terephthalate or polyethylene terephthalate/isophthalate copolyester and said polyester inner layer is selected from the group consisting of polyethylene terephthalate, a copolyester having recurring units of ethylene terephthalate, a copolyester having recurring units of butylene terephthalate and a blend thereof, and also wherein said polycarbonate resin middle layer is an aromatic polycarbonate resin having an elongation at break above about 70%.

3. The laminate according to claim 2 wherein the polyester outer resin layer is a biaxially oriented polyester resin layer having a planar orientation coefficient of about 0.03 to about 0.12 after lamination to the metal sheet.

4. The laminate according to claim 2 wherein the polycarbonate resin is bisphenol A polycarbonate.

5. The laminate according to claim 2 wherein the metal sheet is selected from the group consisting of a steel sheet, steel sheet plated with at least one of tin, nickel or zinc, and an aluminum sheet.

6. The laminate according to claim 5 wherein the metal sheet is covered with a single layer of hydrated chromium oxide or a double layer consisting of an upper layer of hydrated chromium oxide and a lower layer of metallic chromium.

7. The laminate according to claim 6 wherein the amount of hydrated chromium oxide as chromium is about 3 to about 30 mg/m$^2$.

8. The laminate according to claim 6 wherein the amount of metallic chromium in the double layer is about 10 to about 200 mg/m$^2$.

* * * * *